United States Patent [19]

Bott

[11] 4,239,139
[45] Dec. 16, 1980

[54] SLIDING TIE DOWN VEHICLE LUGGAGE CARRIER

[76] Inventor: John A. Bott, 931 Lakeshore Dr., Grosse Pointe Shores, Mich. 48236

[21] Appl. No.: 9,608

[22] Filed: Feb. 5, 1979

[51] Int. Cl.³ .................................................. B60R 9/04
[52] U.S. Cl. ..................................... 224/324; 85/9 R; 85/54; 224/325; 248/220.2; 248/499
[58] Field of Search ...................... 224/309, 321–326; 105/482; 248/220.2, 221.3, 222.1, 222.2, 222.3, 499, 500, 501; 52/155, 157; 85/9 R, 54

[56] References Cited

U.S. PATENT DOCUMENTS

| 1,250,597 | 12/1917 | Kyle ........................ 85/9 R X |
| 1,284,101 | 11/1918 | Hemenway ............... 85/9 R |
| 3,248,996 | 3/1966 | Larson ........................ 85/9R |
| 4,015,760 | 4/1977 | Bott ........................ 224/326 X |
| 4,154,138 | 5/1979 | Melone ....................... 85/9 R X |

FOREIGN PATENT DOCUMENTS

| 2310491 | 12/1976 | France ........................... 85/9 R |
| 45-30847 | 10/1970 | Japan ............................. 85/9 R |

Primary Examiner—Stephen Marcus
Attorney, Agent, or Firm—Harness, Dickey & Pierce

[57] ABSTRACT

A tie down assembly for use in a luggage carrier system having two or more slats which are fixedly secured to an exterior horizontal surface of a vehicle and which are permanently attached thereto and adapted to have ancillary article constraining members removably and adjustably secured thereto, comprising a slat, having a channel formed by its interior surfaces, a rotatable integral tie down element comprising a loop portion, an annular portion, and a threaded bolt, and a slidable plate operably fitting within said channel and detachably engageable with said a threaded bolt to detachably secure and immobilize said tie down element to said slat.

27 Claims, 6 Drawing Figures

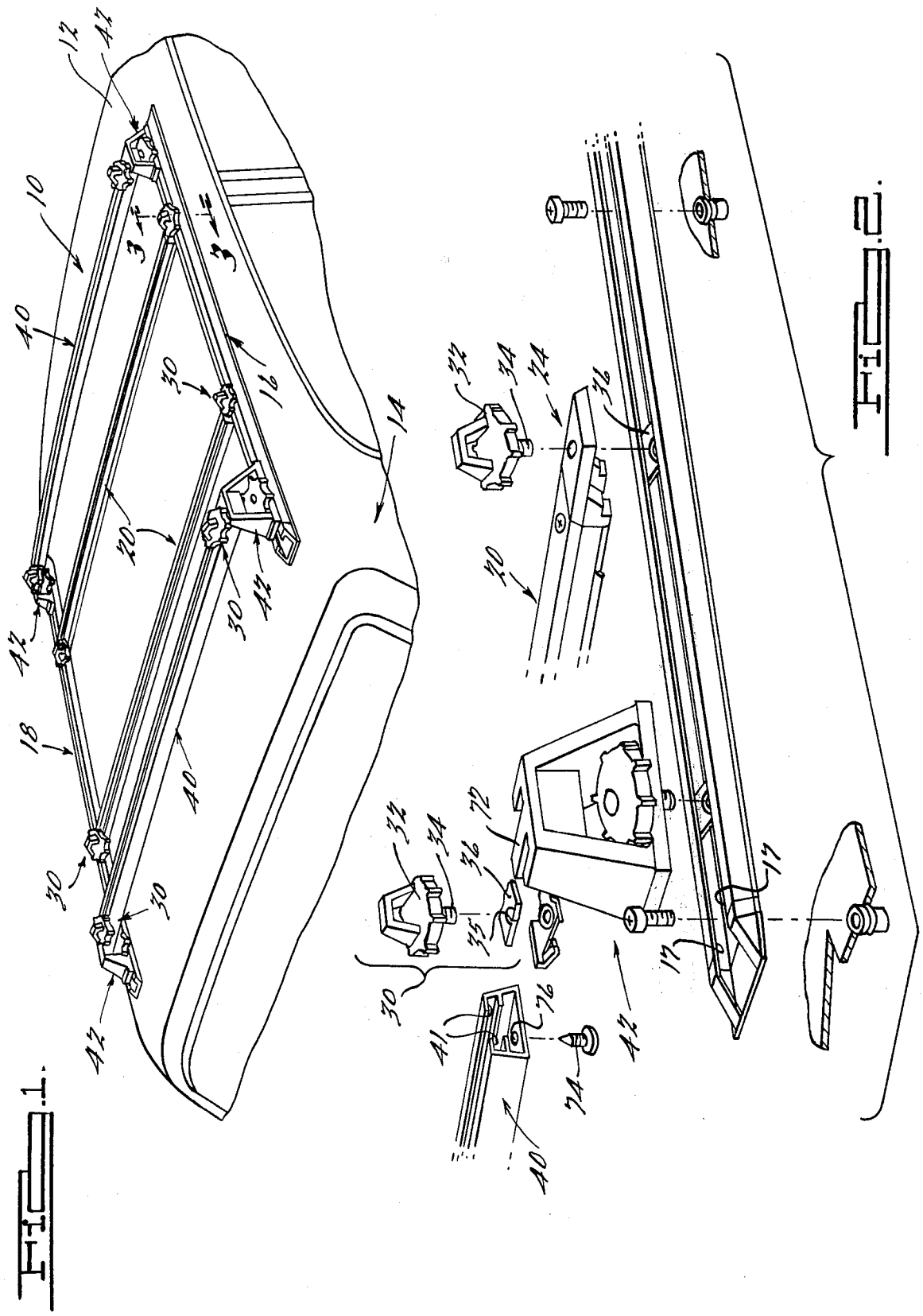

SLIDING TIE DOWN VEHICLE LUGGAGE CARRIER

SUMMARY OF THE INVENTION

The present invention relates generally to vehicle luggage carriers and more particularly to a new and improved sliding tie down device for vehicle luggage carriers of the type shown in the applicant's U.S. Pat. No. 4,099,658 and Ser. No. 952,393, filed Oct. 16, 1978. More specifically the improved sliding tie down device is to be used with luggage carriers of the type comprising two or more slat-type elements which are fixedly secured to an exterior horizontal surface of a vehicle, such as the trunk lid or vehicle roof, and which are permanently attached thereto and adapted to have ancillary article constraining members removably and adjustably secured thereto.

The sliding tie down device of the present invention is specifically designed as an improved adjustable tie down or anchor which also incorporates the object of securing article restraining members such as slats, bars, cross-bars, or rails to the luggage carrier systems, which devices may also have attachment means thereon for securing ancillary article carrying equipment, such as ski racks, bicycle racks, and the like to the carrier system. A device of the present invention also has the object of adding the tie down feature for use with a luggage carrier system as described above along with ropes, straps and other constraining elements to further enlarge the number of potential uses and the efficacy of a luggage carrier of the type described. Yet another object is to provide a tie down device which can be uniformly utilized in securing the various parts to the luggage carrier system interchangeably at whichever location the tie down assembly is desired. Among the other objects of the present invention are the provision of a tie down device which is inexpensive to manufacture, easy to install, compact in size, and convenient to use. The tie down device of the preferred embodiment also provides a highly effective combination of molded plastic and metal to accentuate the durable, aesthetically appealing, light-weight, and inexpensive to manufacture qualities of the molded plastic while also providing the strength and wear resistant properties of the metal portion of the tie down. Other objects and advantages of the instant invention will be apparent in the following specification, claims and drawings.

BRIEF DESCRIPTION OF THE DRAWINGS

FIG. 1 is an elevated perspective view of the roof of an automotive vehicle having slidable tie down devices of the present invention shown in operative association with a vehicle luggage carrier mounted thereon;

FIG. 2 is an exploded assembly view of a portion of the luggage carrier illustrated in FIG. 1;

DESCRIPTION OF THE PREFERRED EMBODIMENT

Figure 3:
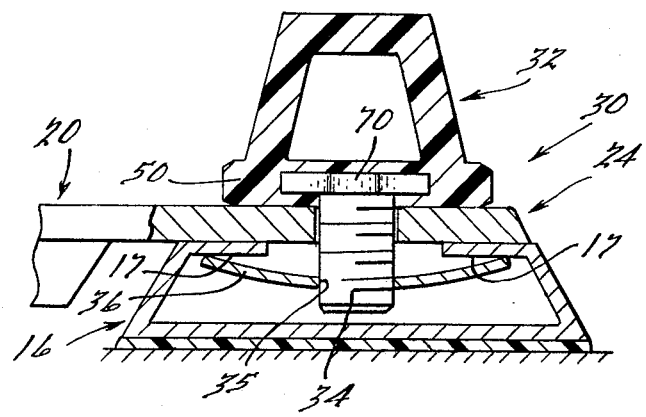
FIG. 3 is an enlarged transverse cross-sectional view taken substantially along the line 3—3 of FIG. 1.

Referring now in detail to the drawings and in particular to FIG. 1 thereof, a vehicle luggage carrier 10 is shown in operative association with a generally horizontally disposed roof portion 12 of a conventional automotive vehicle 14. Generally speaking, the luggage carrier 10 comprises a pair of laterally spaced, longitudinally extending slats 16 and 18 which are secured upon the roof portion 12 at positions adjacent the lateral sides or edges thereof, along with laterally extending cross slats, generally designated by the numeral 20. The cross slats 20 are provided with fittings 24 at the opposite ends thereof. The opposite ends of cross slats 20 are adapted to be adjustably and removably secured by means of sliding tie down assemblies 30 of the present invention including tie down members 32 and threaded studs 34 which are adapted to cooperate with clamping plates 36 that are longitudinally slidably disposed within the slats 16 and 18 for adjustably securing the cross slats 20 at selected longitudinal positions along the slats 16 and 18.

The luggage carrier 10 also includes a pair of cross rails, generally designated by the numeral 40, which extend laterally or transversely between the slats 16 and 18 and are spaced upwardly from the plane of the roof portion 12 and operatively supported upon the slats 16 and 18 by means of a plurality of four stanchion assemblies, generally designated by the numeral 42 which are located one at each end of the cross rails 40, as shown in FIG. 1. The cross rails 40 may be of any suitable construction, but are preferably of a cross section as shown in FIG. 2, in which a track is defined within each cross rail 40 defining a channel adapted to receive one or more clamping plates, generally designated 36.

As shown in FIG. 2, each of the stanchion assemblies 42 includes an inwardly projecting mounting portion 72 which is adapted to be telescopically received within the adjacent end of an associated cross rail 40 and be secured therewith by means of a suitable screw, bolt or the like 74 which extends upwardly through an opening 76 in the adjacent end of cross rail 40.

Figure 4:
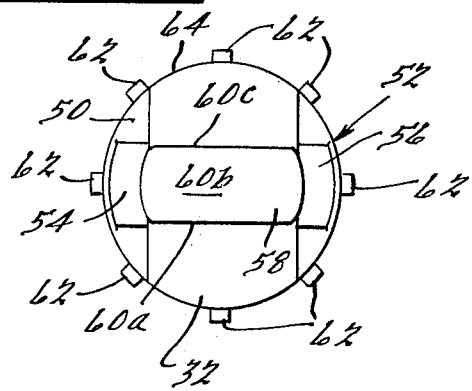
FIG. 4 is an elevated top view of the preferred embodiment of the tie down device of the present invention.
Figure 5:
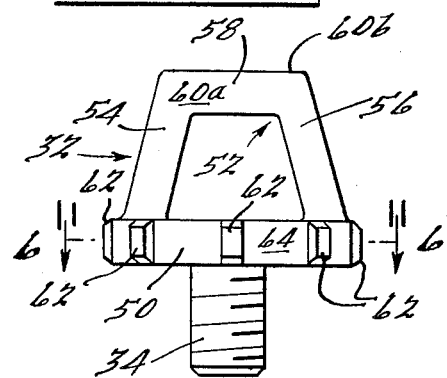
FIG. 5 is a side view of the device illustrated in FIG. 4.

The slidable tie down assembly 30, as stated previously, includes a rotatable tie down member 32, a threaded stud 34, and a clamping plate 36. The tie down member 32 is integral with threaded stud 34 as shown in FIG. 5, and is preferably made of a moldable plastic material, such as nylon. The stud 34, on the other hand is preferably made of metal. The tie down member 32 as shown in FIGS. 4 and 5, comprises an annular manually rotatable portion 50 with a monolithic upwardly projecting loop portion 52 extending generally perpendicularly to the plane of the annular portion 50. The loop portion 52 is comprised of two side columns 54 and 56 mounted integrally at a radially outer station of said annular portion 52 directly opposite one another, as shown in FIGS. 4 and 5. Columns 54 and 56 converge radially inwardly toward one another with a top cross member 58 integrally connected to the top portions of columns 54 and 56 to form the loop 52. The cross section of the columns 54 and 56 and the top cross member 58 is substantially quadrilateral with rounded edges, having exterior surfaces 60a, 60b, and 60c of a scaled or roughened texture to facilitate the manual grasping of the loop 52. The annular manually rotatable portion 50 has a series of knurls, generally designated 62, at circumferentially spaced locations along the outer surface 64 of the annular portion 50, to facilitate manual rotation of the annular portion 50.

The clamping plate 36 is preferably made of metal of a generally flat, rectangular configuration as shown in FIGS. 2 and 3, having some upward curvature from a threaded bore 35 to its edges. The upward curvature provides a degree of spring force when the stud 34 is threadably engaged within the bore 35, forcing the clamping plate 36 upwardly against the upper interior surfaces 17 of the slats 16 and 18 on surfaces 41 of the cross rail 40. The clamping plates 36 may be provided with retainer elements 37 which prevent longitudinal sliding movement of the clamping plates 36 when the associated tie down members 30 have their downwardly extending externally threaded stud elements 34 disengaged from the threaded bores 35 of the clamping plates 36.

Figure 6:
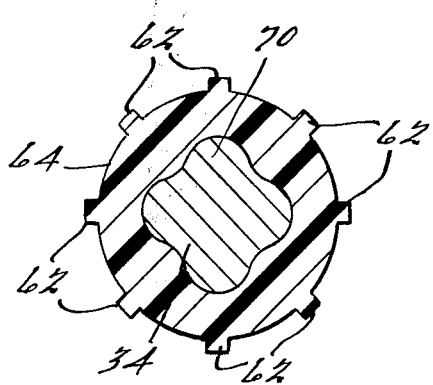
FIG. 6 is a transverse cross-sectional view taken substantially along the line 6—6 of FIG. 5.

The threaded stud 34 is integrally molded into position as part of the tie down assembly 30 at generally the same time that the tie down member 32 is produced by a process known in the art. The stud 34 extends perpendicularly from the annular portion 50 in an axially opposite direction of said tie down portion 52. The axis of the stud 34 is concentric with the axis of the annular portion 50. The head portion 70 of the stud 34 is a four-leaf cloverleaf configuration as shown in FIG. 6, having a relatively thin axial dimension as shown in FIG. 3. This configuration is preferred to virtually eliminate the possibility of slippage between the tie down member 32 and the threaded stud 34 when manually rotated.

The tie down assemblies 30 are adapted to provide for selective longitudinal adjustment of the cross or transverse slats 20 longitudinally of the longitudinally extending slats 16 and 18, with suitable rotation of the tie down members 32 effecting clamping engagement of the associated clamping plates 36 with the lower clamping surfaces 17 of the slats 16 and 18. Conversely, the clamping engagement between the plates 36 and the surfaces 17 is released upon rotation of the members 32 in the opposite direction. Thus, the cross slats 20 may be removed from the slats 16 and 18 during periods of non-use and may be longitudinally moved along the length of slats 16 and 18 so as to be adjustable commensurate with the size and type of load which is being carried upon the associated vehicle 14.

Also, the tie down assemblies are adapted to provide for selective longitudinal adjustment and the removable attachment of ancilllary article carrying equipment, such as ski racks, bicycle racks, and the like to the carrier system either to the longitudinally extending slats 16 and 18, or to a cross rail 40. To be compatible, the ancillary article carrying equipment need only have end portions similar to the fittings 24 of the cross slats 20.

It will be seen from the foregoing that the present invention provides a new and improved sliding tie down device which embodies a number of features not shown in the prior art. In particular, the tie down device of the present invention can be used with luggage carriers of the type herein described adapted to have ancillary article constraining members removably and adjustably secured thereto while also providing the tie down feature for use with ropes, straps, and other constraining elements to further enlarge the number of potential uses and the efficacy of a luggage carrier of the type described.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. An integral tie down element for use in a luggage carrier system, comprising
   an annular portion,
   a loop portion, including two columns integrally connected to said annular portion at radially outward positions from the center of said annular portion, and
   threaded means for clamping said tie down to said luggage carrier system, separate from said annular portion and said loop portion and capable of being integrally connected to said annular portion, said annular and loop portions being made of a plastic material, and said threaded means for clamping being made of metal.

2. A claim in accordance with claim 1, wherein said tie down is rotatable and said clamping means includes means for preventing slipping between said integral loop and annular portions and said threaded means.

3. A claim in accordance with claim 2, wherein said clamping means is a threaded bolt integrally molded into said tie down element and the head of said bolt has a relatively thin axial dimension with respect to the dimension of said bolt head transverse to the axis of said bolt.

4. A claim in accordance with claim 2, wherein said clamping means is a threaded bolt integrally molded into said tie down element and the head of said bolt has a relatively thin axial dimension with respect to the diameter of said bolt.

5. A claim in accordance with claim 4, wherein the head of said bolt has a flat colverleaf transverse configuration.

6. A claim in accordance with claim 5, wherein said cloverleaf configuration has four leaves.

7. A claim in accordance with claim 1, wherein said annular portion includes circumferentially spaced knurls along the radially outer surface thereof.

8. A claim in accordance with claim 7, wherein the outer surfaces of said loop have a roughened texture.

9. A claim in accordance with claim 8, wherein said loop comprises two radially inwardly converging columns integral with a cross member connecting the top portions of said columns.

10. A claim in accordance with claim 9, wherein the cross sections of said columns and said cross member are substantially quadrilateral in configuration with rounded edges.

11. A tie down assembly for use in a luggage carrier system having two or more article restraining members which are fixedly secured to an exterior horizontal surface of a vehicle and which are permanently attached thereto and adapted to have ancillary article constraining members adjustably secured thereto, comprising
   an article restraining member, having a channel formed by its interior surfaces;
   an integral rotatable tie down element, comprising
   an annular portion,
   a loop portion, including two columns integrally connected to said annular portion at radially outward positions from the center of said annular portion, and means for clamping said tie down to said article restraining member separate from said annular portion and said loop portion, and capable of being integrally connected to said annular portion, said annular and loop portions being made of a plastic material and said clamping means being made of metal; and sliding means operably fitting within said channel and detachably engageable with said means for clamping to detachably secure and immobilize said tie down element to said article restraining member.

12. A claim in accordance with claim 11, wherein said tie down element has threaded clamping means.

13. A claim in accordance with claim 12, wherein said sliding means has a hole therein which is detachably engageable with said threaded clamping means.

14. A claim in accordance with claim 13, wherein said channel has a cross section of a dovetail configuration.

15. A claim in accordance with claim 13, wherein said sliding means further comprises a generally rectangular plate having a threaded bore suitable associated with said threaded clamping means and having a slight upward curvature radiating from said bore to the edges of said plate.

16. A claim in accordance with claim 13, wherein said clamping means includes means for preventing slipping between said clamping means and said annular portion.

17. A claim in accordance with claim 16, wherein said clamping means is a threaded bolt capable of being integrally molded into said tie down element.

18. A claim in accordance with claim 17, wherein the head of said bolt has a relatively thin axial dimension with respect to the diameter of said bolt.

19. A claim in accordance with claim 18, wherein the head of said bolt has a cloverleaf cross-sectional configuration.

20. A claim in accordance with claim 19, wherein said cloverleaf configuration has four leaves.

21. A claim in accordance with claim 20, wherein said article restraining member comprises a slat, and said tie down assembly further comprises a cross bar extending transversely between at least two of said slats, and operably associated with said slats, having a hole at each end through each of which said threaded bolt passes to detachably fixedly secure said cross bar to said slat as said clamping means is secured to said sliding means.

22. A claim in accordance with claim 21, wherein said tie down assembly further comprises a device having a flat portion operably associated with said slat and having a hole therein through which said threaded bolt passes to detachably secure said device to said slat as said clamping means is secured to said sliding means.

23. A claim in accordance with claim 22, wherein said sliding means further comprises a generally rectangular plate, having a centrally located threadable bore and a slight upward curvature from said bore to the edges of said plate, said edges contacting the upper interior surfaces of said channel in said slat as said clamping means secures said tie down element to said slat;

said tie down annular portion having circumferentially spaced knurls along the radially outer surface thereof; and said tie down loop being comprised of two radially inwardly converging columns integral with a cross member connecting the top portions of said columns, the cross sections of said columns and said cross member being substantially quadrilateral in configuration, having rounded edges, the outer surfaces of said loop having a roughened texture and the interior surfaces of said loop having a generally smooth texture.

24. A claim in accordance with claim 13, wherein said annular portion includes circumferentially spaced knurls along the radially outer surface thereof.

25. A claim in accordance with claim 24, wherein the outer surfaces of said loop have a roughened texture.

26. A claim in accordance with claim 25, wherein said loop comprises two radially inwardly converging columns integral with a cross member connecting the top portions of said columns.

27. A claim in accordance with claim 26, wherein the cross sections of said columns and said cross member are substantially quadrilateral in configuration with rounded edges.

* * * * *